(12) United States Patent
Shimizu et al.

(10) Patent No.: US 11,106,036 B2
(45) Date of Patent: Aug. 31, 2021

(54) IMAGE DISPLAY APPARATUS AND HEAD-MOUNTED DISPLAY

(71) Applicant: SEIKO EPSON CORPORATION, Tokyo (JP)

(72) Inventors: Takeshi Shimizu, Chino (JP); Makiko Hino, Matsumoto (JP); Shuichi Wakabayashi, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/924,910

(22) Filed: Mar. 19, 2018

(65) Prior Publication Data

US 2018/0284449 A1 Oct. 4, 2018

(30) Foreign Application Priority Data

Mar. 28, 2017 (JP) .............................. JP2017-062566

(51) Int. Cl.
| | | |
|---|---|---|
| *G06F 1/00* | (2006.01) | |
| *G02B 27/01* | (2006.01) | |
| *G02B 27/28* | (2006.01) | |
| *G02B 27/14* | (2006.01) | |
| *G02B 27/10* | (2006.01) | |
| *G02B 26/10* | (2006.01) | |

(52) U.S. Cl.
CPC ....... *G02B 27/0172* (2013.01); *G02B 26/101* (2013.01); *G02B 27/0176* (2013.01); *G02B 27/108* (2013.01); *G02B 27/141* (2013.01); *G02B 27/281* (2013.01); *G02B 2027/0174* (2013.01); *G02B 2027/0178* (2013.01)

(58) Field of Classification Search
CPC .......... G02B 27/01; G02B 27/14; A61B 3/12; A61B 3/028
See application file for complete search history.

(56) References Cited

U.S. PATENT DOCUMENTS

| | | | | |
|---|---|---|---|---|
| 2010/0002154 | A1* | 1/2010 | Hua ....................... | G02B 13/00 349/11 |
| 2010/0026961 | A1* | 2/2010 | Oniki ................. | G02B 26/0808 353/31 |

(Continued)

FOREIGN PATENT DOCUMENTS

| | | |
|---|---|---|
| JP | 2009-086365 A | 4/2009 |
| JP | 2010-117541 A | 5/2010 |

(Continued)

*Primary Examiner* — Michael A Faragalla
(74) *Attorney, Agent, or Firm* — Oliff PLC

(57) ABSTRACT

The image display apparatus includes a light attenuation section that reflects a portion of light emitted from a light source and a scanning section that scans the light reflected by the light attenuation section. The light attenuation section transmits a portion of light emitted from the light source. The light attenuation section has reflectance and transmittance and the reflectance is smaller than the transmittance. The image display apparatus further includes a light receiving element on which the light transmitted through the light attenuation section is incident. The image display apparatus also includes a control section that controls activation of the light source in accordance with detection results of the light receiving element.

14 Claims, 8 Drawing Sheets

(56) References Cited

U.S. PATENT DOCUMENTS

| | | | | |
|---|---|---|---|---|
| 2012/0002167 A1* | 1/2012 | Kondoh | ............... | A61B 3/1025 |
| | | | | 351/211 |
| 2014/0085282 A1* | 3/2014 | Luebke | ................ | G02B 27/017 |
| | | | | 345/207 |
| 2015/0092118 A1* | 4/2015 | Hada | ...................... | B60K 35/00 |
| | | | | 349/11 |
| 2016/0233284 A1* | 8/2016 | Hanamura | .......... | H01L 51/5284 |

FOREIGN PATENT DOCUMENTS

| | | |
|---|---|---|
| JP | 2015-169725 A | 9/2015 |
| JP | 2016-224264 A | 12/2016 |

\* cited by examiner

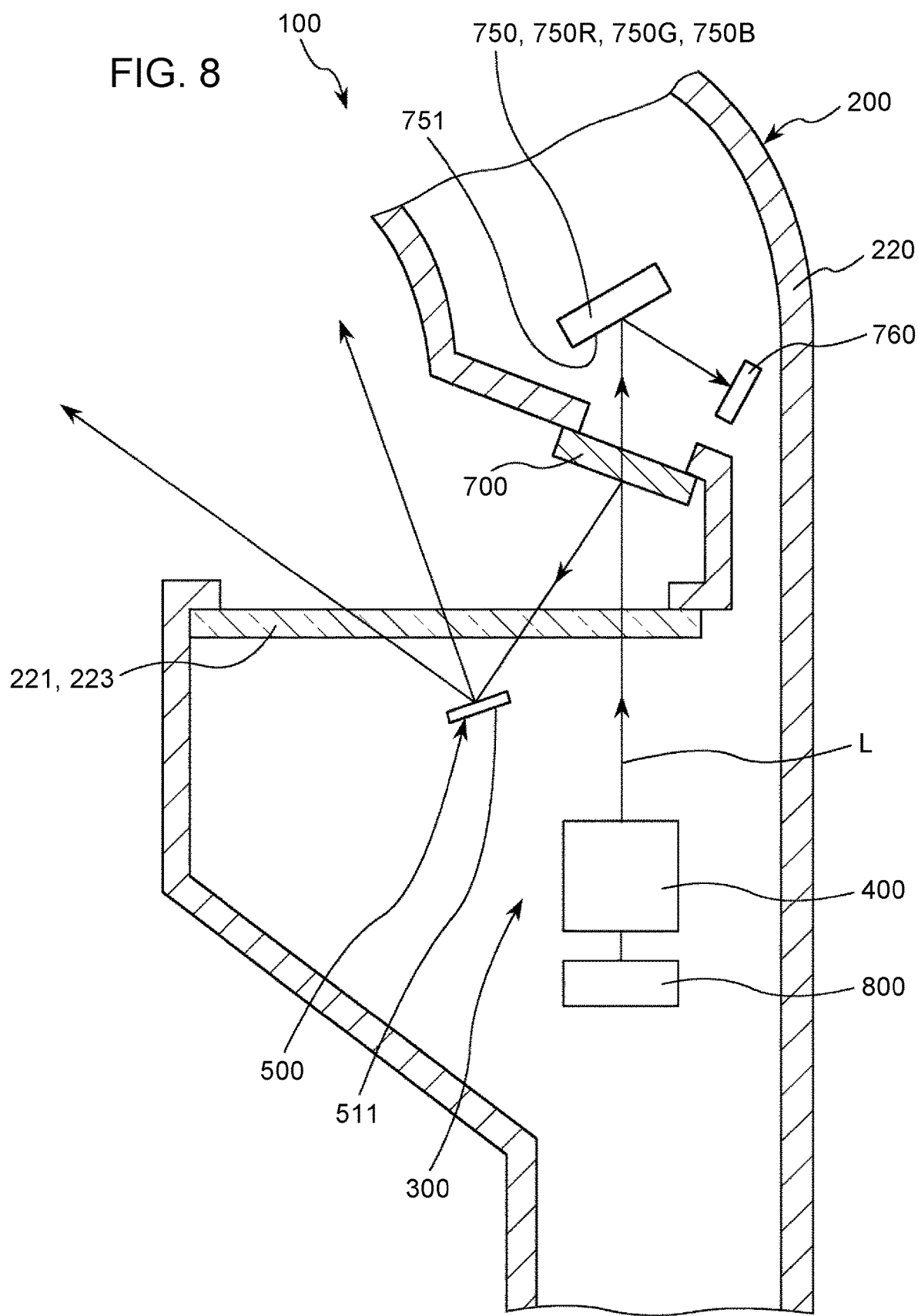

IMAGE DISPLAY APPARATUS AND HEAD-MOUNTED DISPLAY

BACKGROUND

1. Technical Field

The present disclosure relates to an image display apparatus and a head-mounted display.

2. Related Art

As one example of image displaying technologies for image display apparatuses, attention has been directed toward a technology in which laser light is irradiated directly onto the retina of a user's eye so that the user can see images. For example, JP-A-2009-086365 discloses an image display apparatus including a laser light source and a scanning section that scans laser light onto an image-forming region on an eye retina. The image display apparatus according to JP-A-2009-086365 is designed so as to protect the retina from laser light by disposing a neutral-density (ND) filter between the laser light source and the scanning section and attenuating the intensity of the laser light.

However, with the configuration proposed by JP-A-2009-086365, if the ND filter is damaged and cannot perform the light attenuation function, laser light emitted from the laser light source is directly incident on the user's retina without any reduction in the original intensity, which leads to a safety problem.

SUMMARY

An advantage of some aspects of the embodiment is that an image display apparatus and a head-mounted display with high safety are provided.

An image display apparatus according to an aspect of the embodiment includes a light attenuation section that reflects a portion of light emitted from a light source and a scanning section that scans the light reflected by the light attenuation section. This can restrain light with a large intensity from being incident on an eye even if the light attenuation section is damaged. This provides the image display apparatus with high safety.

BRIEF DESCRIPTION OF THE DRAWINGS

The embodiment will be described with reference to the accompanying drawings, wherein like numbers reference like elements.

FIG. 8 is a cross-sectional view illustrating a display unit of an image display apparatus according to a third embodiment.

DESCRIPTION OF EXEMPLARY EMBODIMENTS

Embodiments of an image display apparatus and a head-mounted display according to the disclosure will be described with reference to the accompanied drawings.

First Embodiment

Figure 1:
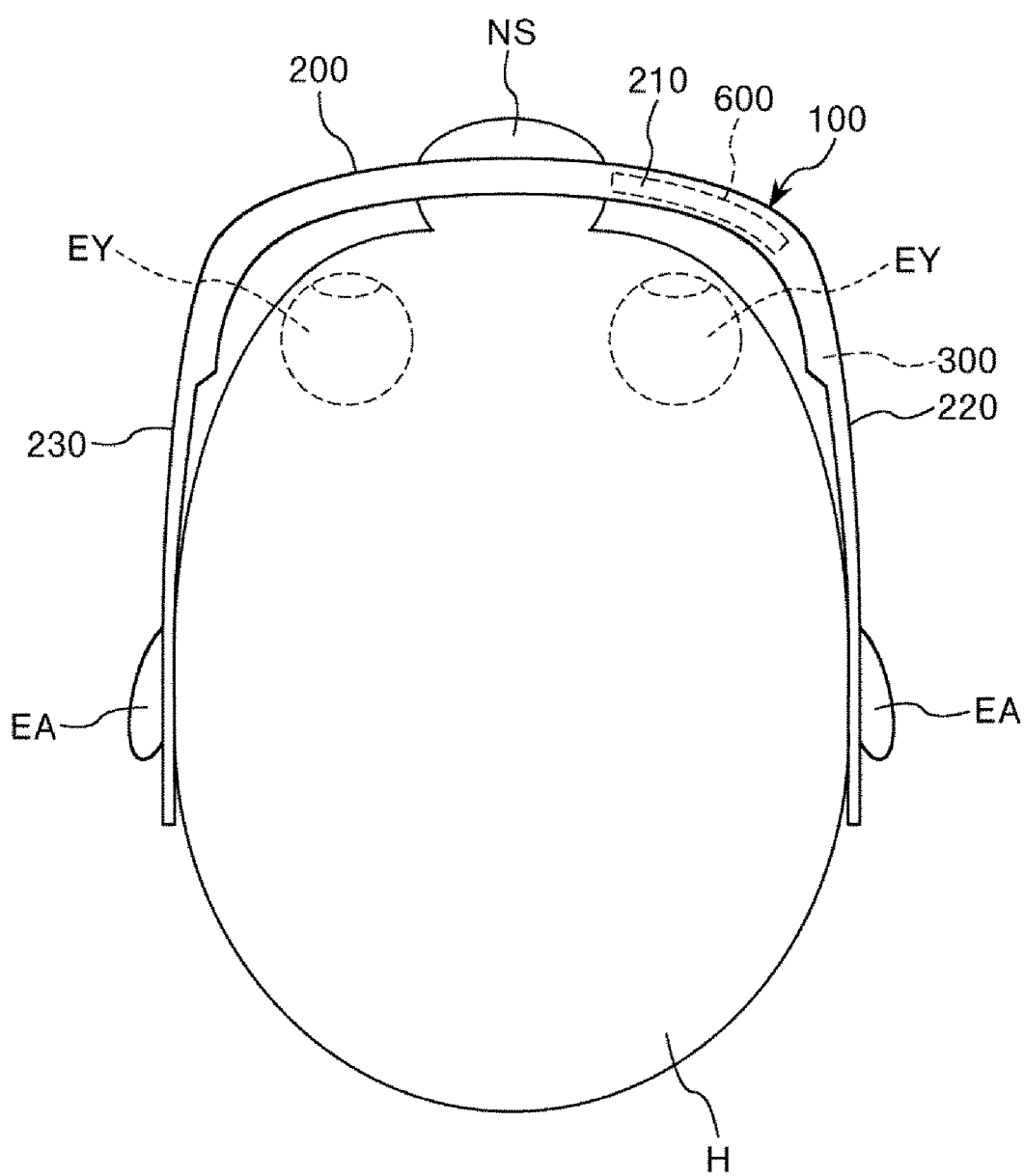
FIG. 1 is a top view illustrating an image display apparatus according to a first embodiment.
Figure 2:
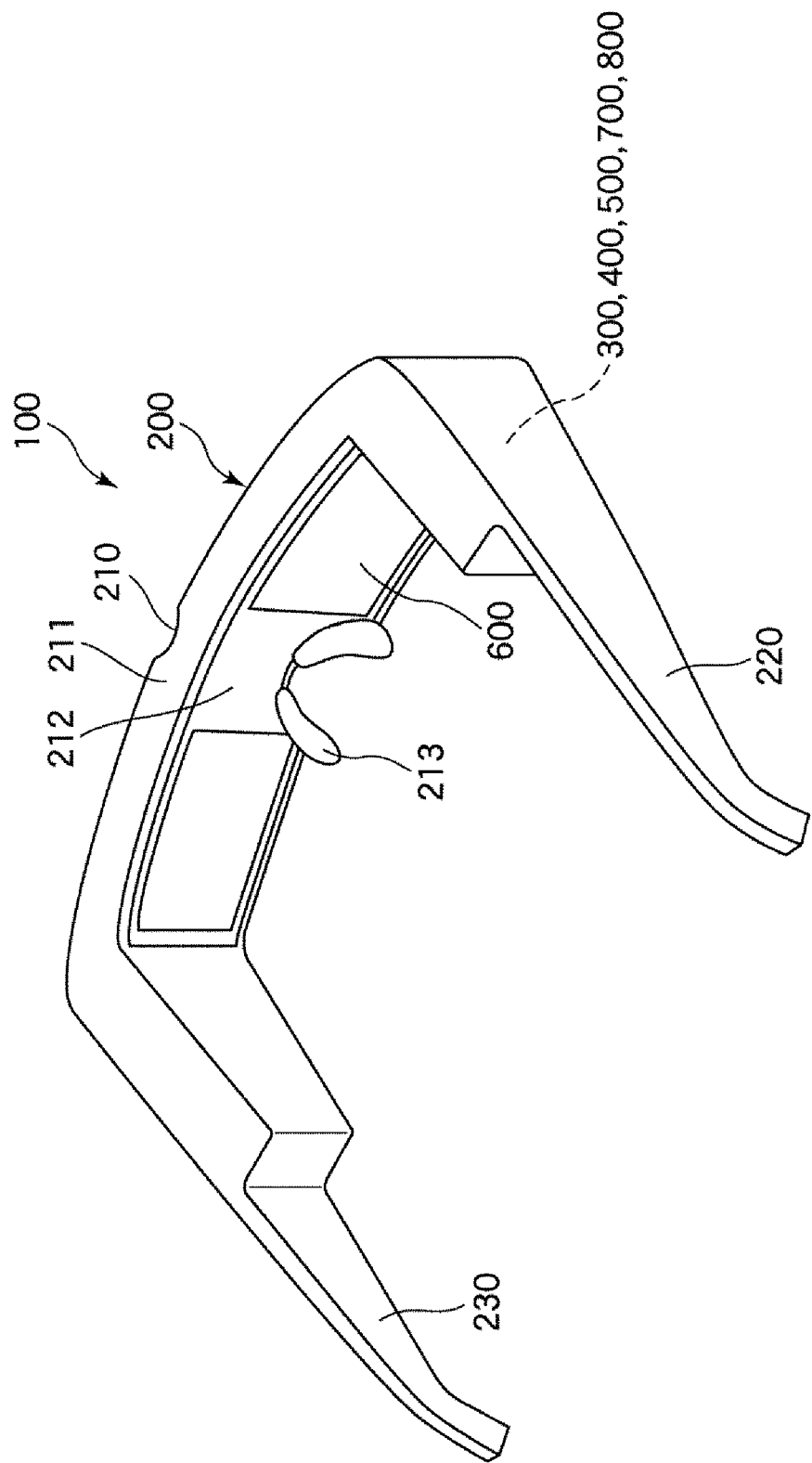
FIG. 2 is a perspective view illustrating the image display apparatus of FIG. 1.
Figure 3:
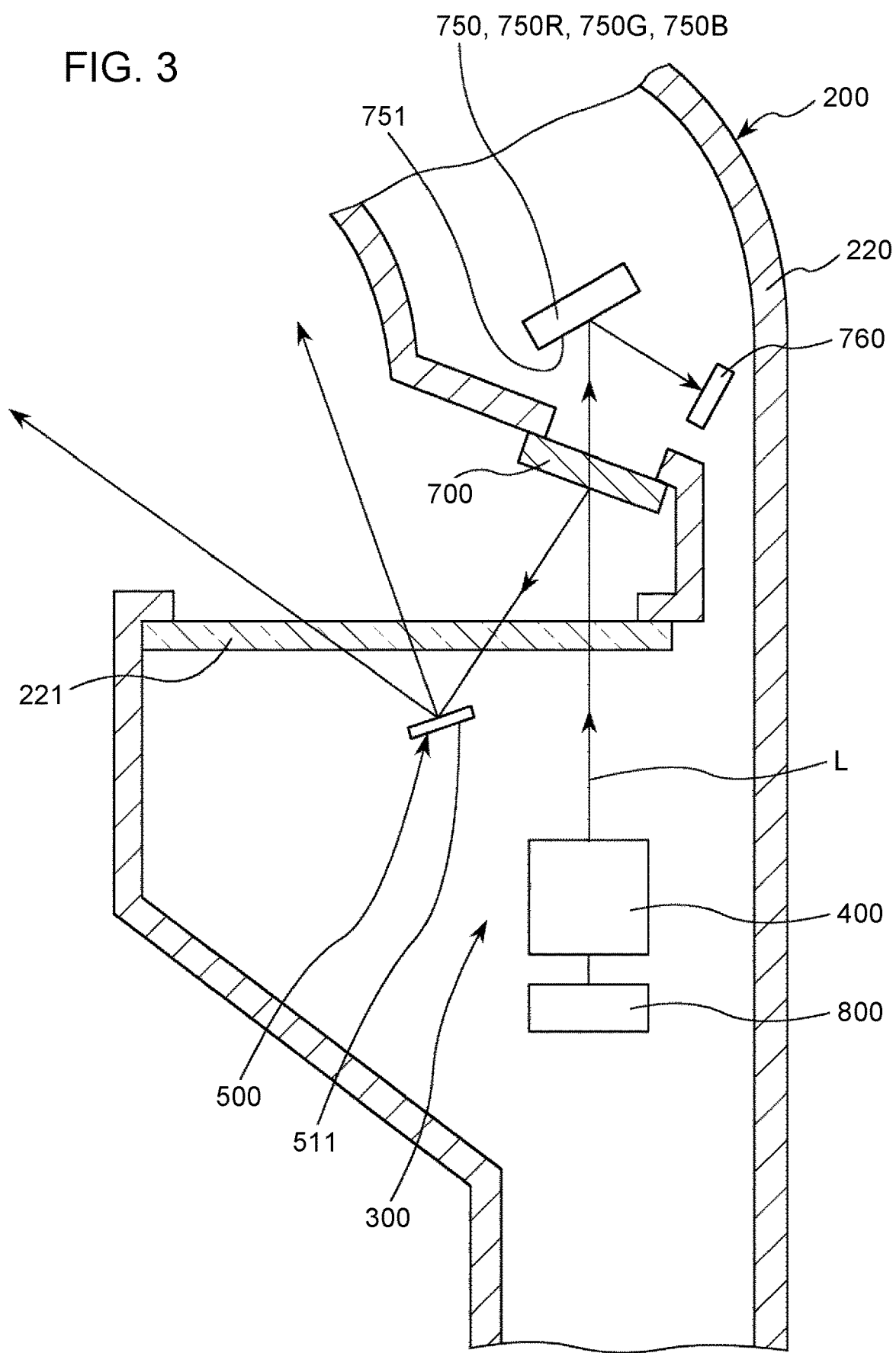
FIG. 3 is a cross-sectional view illustrating a display unit included in the image display apparatus of FIG. 1.
Figure 4:
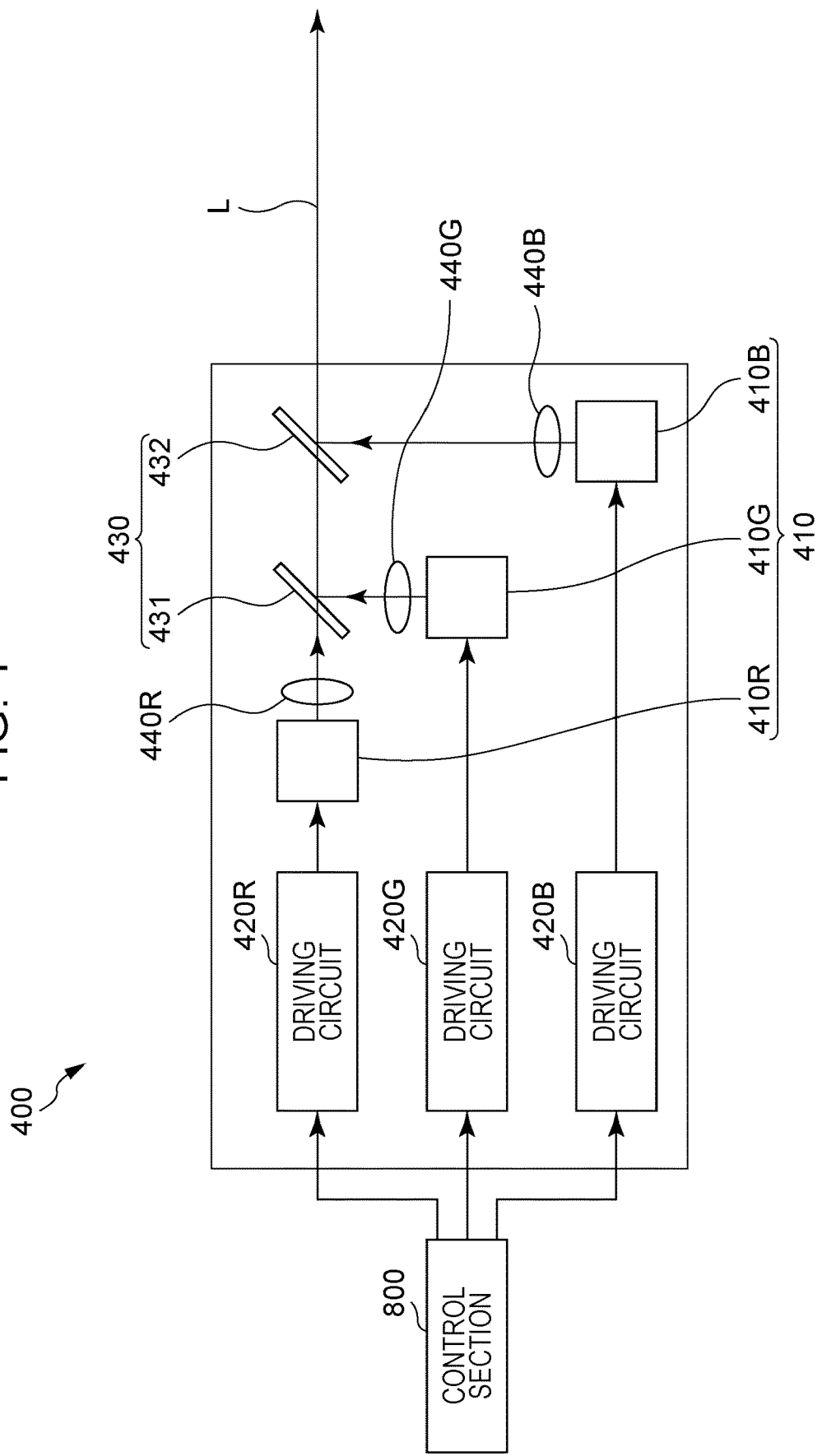
FIG. 4 is a view illustrating a configuration of a modulated-light generation section included in the image display unit of FIG. 3.
Figure 5:
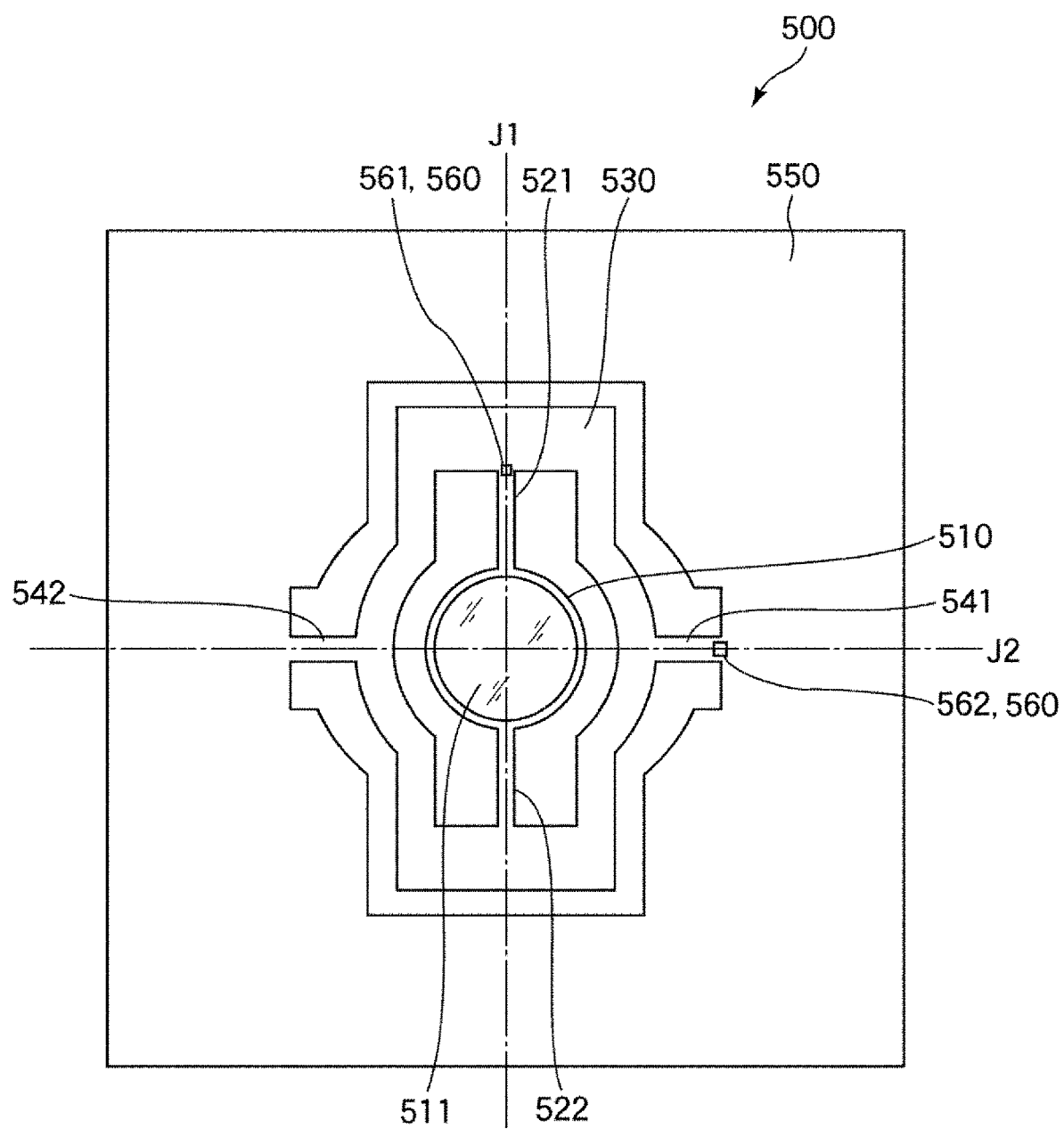
FIG. 5 is a plan view illustrating a scanning section included in the display unit of FIG. 3.
Figure 6:
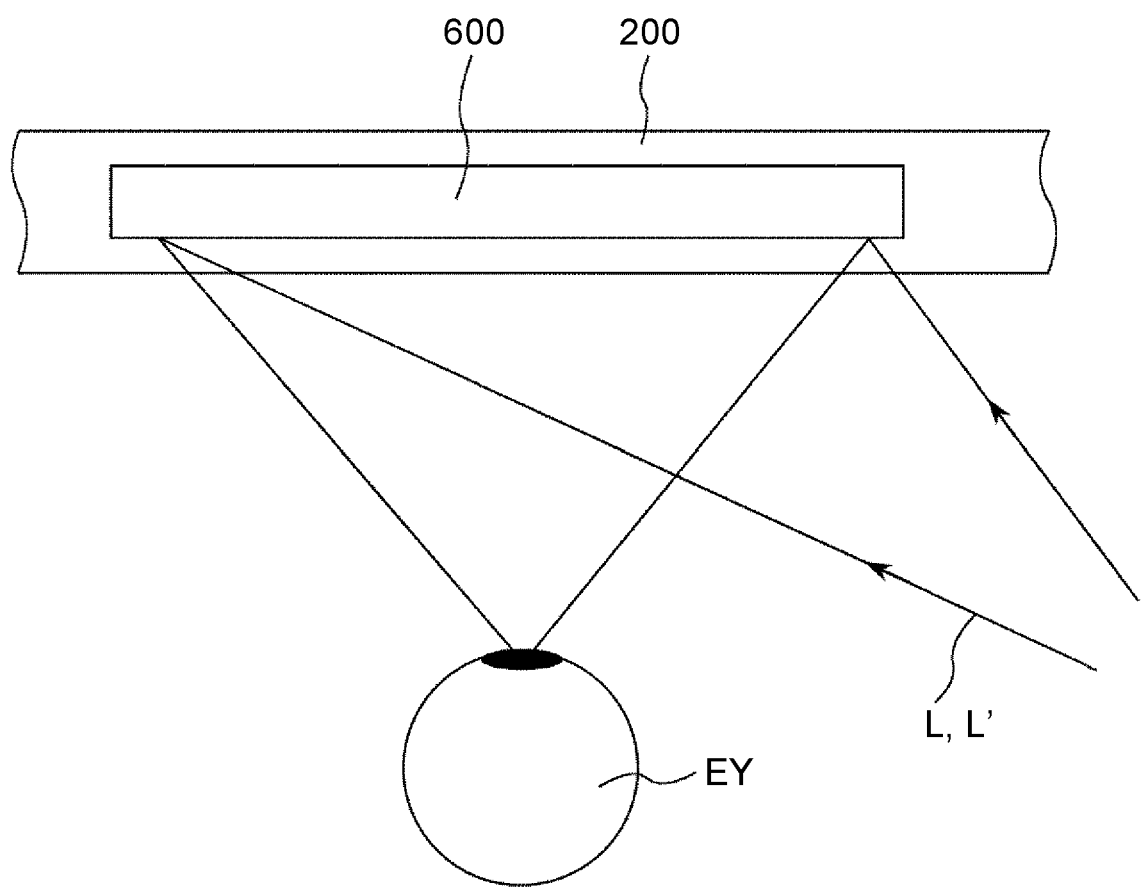
FIG. 6 is a top view illustrating a deflector section.

FIG. 1 is a top view illustrating an image display apparatus according to a first embodiment. FIG. 2 is a perspective view illustrating the image display apparatus of FIG. 1. FIG. 3 is a cross-sectional view illustrating a display unit included in the image display apparatus of FIG. 1. FIG. 4 is a view illustrating a configuration of a modulated-light generation section included in the image display unit of FIG. 3. FIG. 5 is a plan view illustrating a scanning section included in the display unit of FIG. 3. FIG. 6 is a top view illustrating a deflector section. Note that with respect to an observer who wears the head-mounted display, "right" refers to the region on the right-hand side of the observer, "left" refers to the region on the left-hand side of the observer, "front" refers to the region in front of the observer, and "rear" refers to the region to the rear of the observer for convenience of description.

An image display apparatus 100 illustrated in FIG. 1 is a head-mounted display (i.e., head-mount type image display apparatus). Such an image display apparatus 100 has an eyeglasses-like appearance. When used, the image display apparatus 100 is worn on the head H of an observer so that the observer can see a virtual image that is superimposed on the observer's outside view.

As illustrated in FIG. 1, the image display apparatus 100 includes a frame 200, a display unit 300, and a deflector section 600. The display unit 300 and the deflector section 600 are supported by the frame 200. Note that the display unit 300 according to the present embodiment is provided for the right eye of the observer. However, the display unit 300 is not limited to this configuration, and may be provided for the left eye. Alternatively, respective display units 300 can be provided for the right and left eyes of the observer. In other words, the head-mounted display can be a display for a single eye or a display for both eyes.

As illustrated in FIG. 2, the frame 200 is shaped like an eyeglasses frame and supports the display unit 300. In addition, the frame 200 includes a front portion 210 that is positioned in front of the observer's eyes EY and a pair of temple portions 220, 230 that extend from respective right and left ends of the front portion 210.

In addition, the front portion 210 has a rim portion 211 as well as a shade portion 212 and nose pads 213 which are supported by the rim portion 211. The shade portion 212 has a function of constraining external light from entering. The shade portion 212 supports the deflector section 600. The nose pads 213 are disposed at the center portion of the shade portion 212. When the observer wears the image display apparatus 100 on the head H, the nose pads 213 abut against the observer's nose NS, thereby supporting the image display apparatus 100 relative to the observer's head H.

The temple portions 220, 230 are connected to the front portion 210. The temple portions 220, 230 are formed so as to abut against the observer's ears EA when the observer wears the image display apparatus 100 on the head H. Note that the temple portions 220, 230 may be formed so as to be collapsible, or not collapsible, relative to the front portion 210.

Despite the above description of the frame 200, the shape of the frame 200 is not limited to that illustrated in the drawings with respect to the frame 200 being worn on the observer's head H and supporting the display unit 300 and the deflector section 600.

As illustrated in FIG. 3, the display unit 300 includes a modulated-light generation section 400, a scanning section 500, a light attenuation section 700, and a control section 800. The display unit 300 is configured such that the modulated-light generation section 400 generates modulated light L corresponding to a video signal from the control section 800, the scanning section 500 scans the modulated light L two-dimensionally, and the deflector section 600 deflects the modulated light L scanned in the scanning section 500 toward an observer's eye EY. Moreover, the display unit 300 is configured such that the light attenuation section 700 weakens (attenuates) the modulated light L before being scanned by the scanning section 500. The display unit 300 configured as such enables the observer to see images (virtual images) according to the video signal. In addition, images can be displayed with an appropriate brightness thanks to the light attenuation section 700 attenuating the modulated light L.

Note that a cover portion 221 is disposed in the temple portion 220. The cover portion 221, which is disposed in a region intersecting a path of the modulated light L, has a light-transmissive property so as not to block the modulated light L. The cover portion 221 can be formed, for example, of a glass substrate that is substantially colorless and transparent. The scanning section 500 can be made dust-proof or water resistant by forming the cover portion 221, the temple portion 220, and other members accordingly. Alternatively, the cover portion 221 can be omitted.

The modulated-light generation section 400 is disposed in the temple portion 220. As illustrated in FIG. 4, the modulated-light generation section 400 includes a light source section 410, driving circuits 420R, 420G, 420B, collimator lenses 440R, 440G, 440B, and a light-combining section 430. The light source section 410 has a plurality of light sources 410R, 410G, 410B of different wavelengths. The driving circuits 420R, 420G, 420B drive respective light sources 410R, 410G, 410B. The collimator lenses 440R, 440G, 440B convert light beams emitted from the light sources 410R, 410G, 410B into parallel beams.

The light source 410R is a laser light source that emits a red laser light. The light source 410G is a laser light source that emits a green laser light. The light source 410B is a laser light source that emits a blue laser light. By using these three color lights, full-color images can be displayed. By using these laser light sources as the light sources 410R, 410G, 410B, clear images can be displayed. The light sources 410R, 410G, 410B are not limited to particular devices but may be formed, for example, by using laser diodes. However, the light sources 410R, 410G, 410B are not limited to the laser light sources.

The driving circuit 420R has a function that drives the light source 410R. The driving circuit 420G has a function that drives the light source 410G. The driving circuit 420B has a function that drives the light source 410B. The control section 800 controls each of these driving circuits 420R, 420G, 420B individually. Three laser light beams, which are emitted by the light sources 410R, 410G, 410B that are driven by respective driving circuits 420R, 420G, 420B, are made to be parallel beams by using respective collimator lenses 440R, 440G, 440B and are subsequently incident on the light-combining section 430.

The light-combining section 430 combines laser beams from the light sources 410R, 410G, 410B. In the embodiment, the light-combining section 430 includes two dichroic mirrors 431, 432. The dichroic mirror 431 has a function of transmitting red light and reflecting green light. The dichroic mirror 432 has a function of transmitting red light and green light and reflecting blue light. By using such dichroic mirrors 431, 432, three color light beams, which are red, green, and blue beams from the light sources 410R, 410G, 410B, are combined. At this moment, the control section 800 individually modulates the intensities of respective laser beams from the light sources 410R, 410G, 410B so as to generate modulated light L having a predetermined color. The light-combining section 430 is not limited to a specific configuration as far as laser beams from the light sources 410R, 410G, 410B can be appropriately combined.

A configuration of the modulated-light generation section 400 has been described. However, the modulated-light generation section 400 is not limited to this configuration as far as modulated light L can be generated. For example, as far as the modulated-light generation section 400 can generate modulated light L, the modulated-light generation section 400 may be disposed at a location other than the frame 200, and modulated light L may be transmitted via an optical fiber or the like to a light emitting position in the temple portion 220. For example, the modulated-light generation section 400 may be stored in a housing different from that of the image display apparatus 100, and modulated light L may be transmitted from the housing to the image display apparatus 100 via an optical fiber. Moreover, it is sufficient that the modulated-light generation section 400 has at least one light source. The color of light emitted from the light source is not limited to a particular color.

The scanning section 500 is disposed in the temple portion 220. The scanning section 500 is an optical scanner that two-dimensionally scans the modulated light L emitted from the modulated-light generation section 400 toward the deflector section 600.

The scanning section 500 is an optical scanner that is swingable about two axes. As illustrated in FIG. 5, the scanning section 500 includes a movable portion 510, shaft portions 521, 522, a driven frame portion 530, shaft portions 541, 542, and a support portion 550. The movable portion 510 has a mirror 511. The shaft portions 521, 522 support the movable portion 510 such that the movable portion 510 is swingable (turnable) about an axis J1. The shaft portions 521, 522 are supported by the driven frame portion 530. The shaft portions 541, 542 support the driven frame portion 530 such that the driven frame portion 530 is swingable (turnable) about an axis J2 that orthogonally intersects the axis J1. The shaft portions 541, 542 are supported by a support portion 550, which is shaped like a frame. In the scanning section 500 configured as such, while the driven frame portion 530 is caused to swing about the axis J2 relative to the support portion 550, the movable portion 510 is caused to swing about the axis J1 relative to the driven frame portion 530. Consequently, the movable portion 510 swings about both axes J1 and J2, thereby enabling the mirror 511 to two-dimensionally scan modulated light L that is reflected by the mirror 511. The scanning section 500 is configured such that the movable portion 510 swinging about the axis J1 scans modulated light L in the right-and-left direction (i.e., horizontal direction) of the frame 200, whereas the movable portion 510 swinging about the axis J2 scans the modulated light L in the up-and-down direction (i.e., vertical direction) of the frame 200.

The scanning section 500 also includes a detector portion 560 that detects the orientation of the movable portion 510. The detector portion 560 has two piezoelectric devices 561, 562 that are disposed at respective joints of the shaft portions 521, 541. The detector portion 560 is configured to detect the orientation of the movable portion 510 by calculating the angles of inclination of the movable portion 510 about the axis J1 and about the axis J2 on the basis of respective changes in resistances of the piezoelectric devices 561, 562. The results of the orientation of the movable portion 510, detected and calculated by the detector portion 560, are sent to the control section 800. The control section 800 controls the modulated-light generation section 400 such that the modulated-light generation section 400 emits modulated light L in synchronization with the orientation of the movable portion 510.

By employing an optical scanner swingable about two axes as the scanning section 500, the scanning section 500 can be made simple in configuration and flexible in component arrangement (especially in component alignment). Moreover, the scanning section 500 can be made small.

Note that the scanning section 500 is not limited to a specific configuration as far as the scanning section 500 can scan modulated light L two-dimensionally. For example, the scanning section 500 may include two optical scanners each of which scans modulated light L one-dimensionally. Alternatively, the scanning section 500 may include a polygon mirror or a galvanometer mirror in place of the optical scanner.

The deflector section 600 is disposed in the front portion 210 and, when in use, positioned in front of the observer's right eye. As illustrated in FIG. 6, the deflector section 600 is sized so as to cover the observer's right eye. The deflector section 600 has a function of causing the modulated light L scanned by the scanning section 500 to be incident on the observer's eye EY as a video image.

The deflector section 600 is formed, for example, of a holographic element (i.e., holographic mirror), which is one type of diffraction grating. The holographic element is a semi-transmissive film capable of diffracting light being within a specific wavelength range and transmitting light being out of the wavelength range. This enables the observer to view video images (virtual images) while viewing the outside. In other words, a see-through type head-mounted display can be implemented. Note that the deflector section 600 is not limited to this configuration. For example, a half-silvered mirror can be used for the deflector section 600.

As illustrated in FIG. 3, the light attenuation section 700 is disposed in the temple portion 220. The light attenuation section 700 has a function of attenuating modulated light L emitted from the modulated-light generation section 400. The light sources 410R, 410G, 410B are laser light sources, which make it difficult to weaken the intensity (output power) of laser light. However, if images formed of modulated light L had such intensity as it was when emitted from the modulated-light generation section 400 and were directly introduced to the observer's eye EY, the images would be too bright for the observer to view. According to the present embodiment, the intensity of modulated light L is attenuated by using the light attenuation section 700. Images that are moderately bright and easier to view are thereby obtained. Moreover, by weakening the intensity of modulated light L, the observer's retina can be protected from the modulated light L, which makes the image display apparatus 100 safer.

Note that modulated light L is preferably attenuated to an intensity of 1 μW or less before being incident on the eye EY. Modulated light L emitted from the modulated-light generation section 400 may have an intensity of approximately 100 mW. In this case, the modulated light L needs to be attenuated to approximately $\frac{1}{100000}$.

The light attenuation section 700 attenuates the modulated light L emitted from modulated-light generation section 400 before being scanned by the scanning section 500 (i.e., upstream of the scanning section 500). This can reduce generation of heat in the scanning section 500 (especially the mirror 511), which leads to stable driving of the scanning section 500.

The light attenuation section 700 has a function of reflecting a portion of modulated light L. The modulated light L that is reflected by the light attenuation section 700 is scanned by the scanning section 500. With this configuration, if, for example, the light attenuation section 700 is damaged, the reflectance of the light attenuation section 700 decreases. As a result, modulated light L having an intensity smaller than normal is incident on the eye EY, or a substantially entire portion of the modulated light L is transmitted through (i.e., passes through) the light attenuation section 700 so that the modulated light L is not incident on the eye EY. In other words, with this configuration, modulated light L having an intensity larger than normal can be prevented from being incident on the eye EY. Thus, the image display apparatus 100 can exhibit high safety.

It is preferable that the light attenuation section 700 reflect modulated light L uniformly without depending on specific wavelengths. As a result, the image display apparatus 100 can provide the observer with clear images.

The light attenuation section 700 has a function of transmitting a portion of the modulated light L. In short, the light attenuation section 700 has a function of transmitting a portion of the modulated light L and reflecting a portion of the modulated light L. With this configuration, generation of heat in the light attenuation section 700 can be reduced, and thus deformation or damage occurring to the light attenuation section 700 is reduced. This provides the image display apparatus 100 with high reliability.

The reflectance of the light attenuation section 700 is designed to be smaller than the transmittance thereof. This causes the light attenuation section 700 to transmit most of the modulated light L. Thus, the light attenuation section 700 can attenuate the modulated light L effectively. The reflectance of the light attenuation section 700 is not specifically limited but is preferably such that modulated light L can be attenuated to an intensity of 1 μW or less. More specifically, the reflectance of the light attenuation section 700 is, for example, from 0.0001% or more to 1% or less although the reflectance varies depending on the intensity of the modulated light L generated by modulated-light generation section 400.

The light attenuation section 700 is preferably formed, for example, by using a material such as, but not limited to, a dielectric multilayer film that is normally used as an antireflection film, a polarizing plate, a half-silvered mirror, or a holographic reflector. Each of these materials, which exhibits a small reflectance, can be preferably used for the light attenuation section 700. Moreover, a clear substrate such as, for example, a glass plate or a plastic plate can be used for the light attenuation section 700. Each of these materials, which also exhibits a small reflectance, can be preferably used for the light attenuation section 700. These materials contribute to cost reduction. When a dielectric multilayer film is used for the light attenuation section 700, the light attenuation section 700 can be designed so as to adjust the reflectance in accordance with the wavelength of each laser light. The reflectance can be thereby adjusted to a desired value. This can provide the observer with clearer images.

The light attenuation section 700 has been described. However, the light attenuation section 700 is not limited to this configuration as far as the light attenuation section 700 can reflect a portion of the modulated light L. The light attenuation section 700 according to the embodiment is configured to transmit the modulated light L that is not reflected. However, the light attenuation section 700 is not limited to this configuration but, for example, can absorb the modulated light L that is not reflected.

The modulated light L reflected by the light attenuation section 700 is incident on the scanning section 500 in a direction from a front region in the image display apparatus 100. In other words, the modulated light L reflected by the light attenuation section 700 proceeds in a direction from the connection region between the temple portion 220 and the front portion 210 to the free end region of the temple portion 220. The modulated light L is subsequently incident on the mirror 511 of the scanning section 500. With this configuration, images with less distortion can be formed compared to the opposite case in which the modulated light L is incident on the scanning section 500 in a direction from a rear region in the image display apparatus 100.

The display unit 300 also includes a light receiving element 750 that receives the modulated light L transmitted through the light attenuation section 700. The light receiving element 750 is a photodetector that includes a photodiode 750R that receives red laser light emitted by the light source 410R, a photodiode 750G that receives green laser light emitted by the light source 410G, and a photodiode 750B that receives blue laser light emitted by the light source 410B. The light receiving element 750 receives modulated light L and detects the intensity of laser light of each color.

The control section 800 controls each of the driving circuits 420R, 420G, 420B in accordance with the detection results from the light receiving element 750. More specifically, the control section 800 controls each of the driving circuits 420R, 420G, 420B in accordance with the detection results from the light receiving element 750 in such a manner that the intensity of laser light of each color assumes a desired value (predetermined value). Accordingly, the intensity of laser light of each color can be corrected to the desired intensity, thereby enabling the image display apparatus 100 to provide the observer with clear images. In addition, the control section 800 can also detect damage to the light attenuation section 700 on the basis of the detection results of the light receiving element 750. For example, in the case that the light attenuation section 700 is damaged, the intensity of the modulated light L received by the light receiving element 750 changes relative to that in the case of not being damaged. On the basis of this change, the control section 800 can detect damage to the light attenuation section 700.

Here, the incident angle of modulated light L with respect to the light receiving surface 751 of the light receiving element 750 deviates from 0 degree. This deviation can prevent the modulated light L reflected by the light receiving surface 751 from returning to the light sources 410R, 410G, 410B. This leads to stable driving of the light sources 410R, 410G, 410B. However, the incident angle of the modulated light L with respect to the light receiving surface 751 is not limited to a specific value but may be 0 degree. Moreover, the light receiving element 750 may be omitted.

The display unit 300 includes a light absorber 760 that absorbs the light reflected by the light receiving surface 751. The light absorber 760 terminates the path of the modulated light L after being transmitted through the light attenuation section 700 so that the light reflected by the light receiving surface 751 is prevented effectively from becoming stray light. The light absorber 760 is not limited to this configuration but may be formed of a member of which the surface is coated with a light-absorbing black paint. The light absorber 760 may be omitted. In the case in which the light receiving element 750 described above is not provided, it is preferable that the modulated light L transmitted through the light attenuation section 700 be incident on the light absorber 760. The light absorber 760 terminates the path of the modulated light L after being transmitted through the light attenuation section 700 so that the light reflected by the light receiving surface 751 is prevented effectively from becoming stray light.

The image display apparatus 100 (i.e., head-mounted display) has been described. As described above, the image display apparatus 100 (head-mounted display) includes the light attenuation section 700, which reflects a portion of the modulated light L (light) emitted from the modulated-light generation section 400 (light source), and the scanning section 500, which scans the modulated light L reflected by the light attenuation section 700. With this configuration, if, for example, the light attenuation section 700 is damaged, the reflectance of the light attenuation section 700 decreases. As a result, modulated light L having an intensity smaller than normal is incident on the eye EY, or a substantially entire portion of the modulated light L is transmitted through (i.e., passes through) the light attenuation section 700 so that the modulated light L is not incident on the eye EY. In other words, with this configuration, modulated light L having an intensity larger than normal can be prevented from being incident on the eye EY. This provides the image display apparatus 100 with high safety.

As also described above, in the image display apparatus 100, the light attenuation section 700 transmits a portion of the modulated light L emitted from the modulated-light generation section 400 (light source). With this configuration, generation of heat in the light attenuation section 700 can be reduced, and thus deformation or damage occurring to the light attenuation section 700 is reduced. This provides the image display apparatus 100 with high reliability.

Moreover, in the image display apparatus 100, light attenuation section 700 has the reflectance that is smaller than the transmittance thereof. This causes the light attenuation section 700 to transmit most of the modulated light L. Thus, the light attenuation section 700 can attenuate the modulated light L effectively. This provides the image display apparatus 100 with high safety.

In addition, the image display apparatus 100 includes the light receiving element 750 on which the modulated light L transmitted through the light attenuation section 700 is incident. The light receiving element 750 enables the image display apparatus 100 to detect the intensity (deviation from a target value) of the modulated light emitted from the modulated-light generation section 400.

Moreover, the image display apparatus 100 includes the control section 800 that controls activation of the modulated-light generation section 400 (light source) in accordance with the detection results of the light receiving element 750. This enables the intensity of the modulated light L to be set as a target value for control, leading to clear images being displayed.

Second Embodiment

Figure 7:
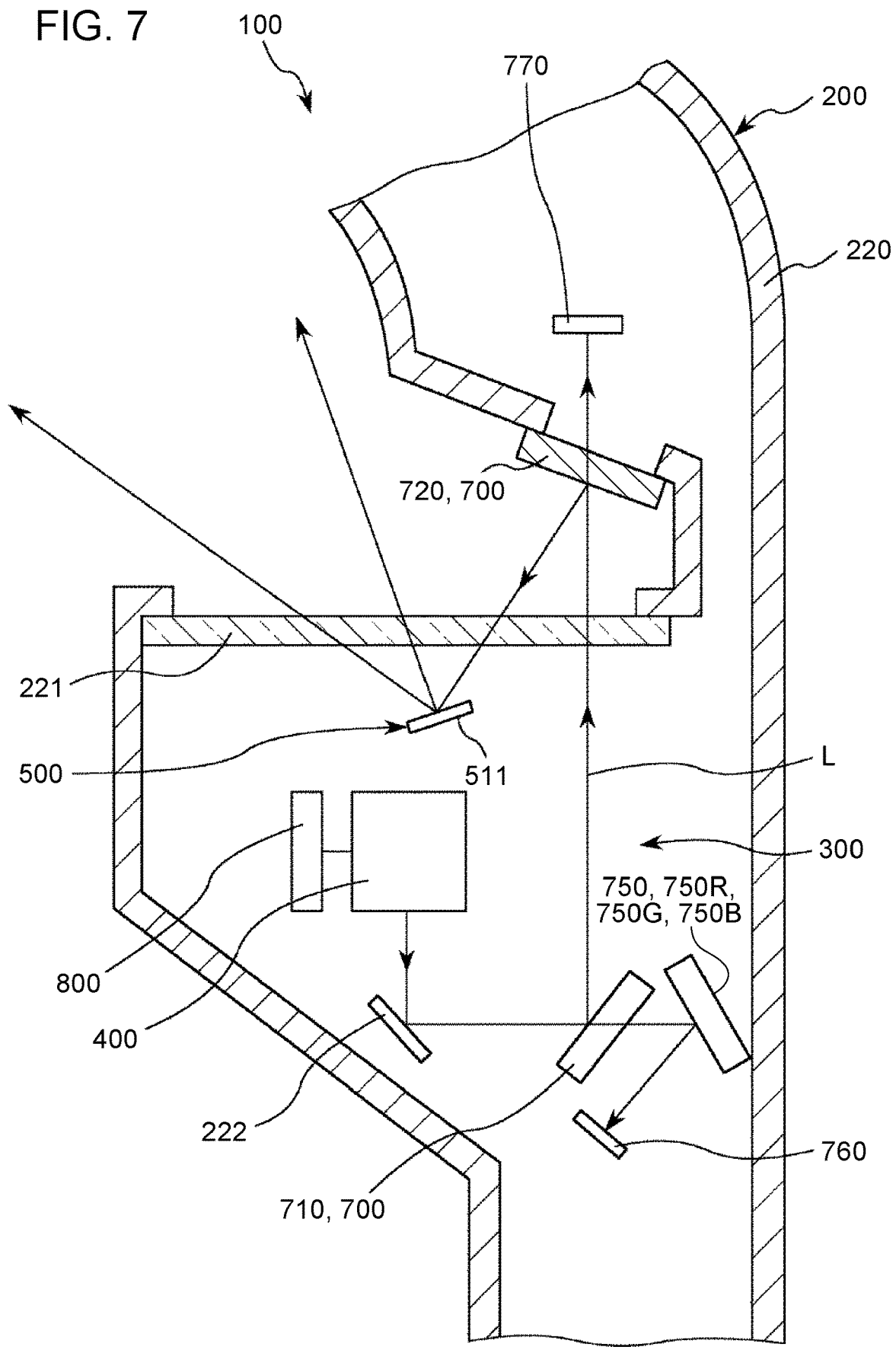
FIG. 7 is a cross-sectional view illustrating a display unit of an image display apparatus according to a second embodiment.

FIG. 7 is a cross-sectional view illustrating a display unit of an image display apparatus according to a second embodiment.

The second embodiment will be described below by focusing on differences from the above-described embodiment, and duplicated explanation is omitted for similar items.

An image display apparatus 100 according to the second embodiment is substantially same as that in the first embodiment described above except that the display unit 300 has a different configuration. Note that in FIG. 7, elements similar to those described in the previous embodiment are denoted by the same numerals.

In the present embodiment, as illustrated in FIG. 7, the display unit 300 has a plurality of light attenuation sections 700 and is configured such that modulated light L is incident on the scanning section 500 after being reflected by a plurality of the light attenuation sections 700. With this configuration, a plurality of the light attenuation sections 700 attenuates modulated light L. Thus, modulated light L can be attenuated more effectively. Moreover, the amount of intensity reduction when attenuated by each of the light attenuation sections 700 can be made small, which, for example, increases the number of material choices available for the light attenuation section 700 and enables cost reduction of the light attenuation section 700.

More specifically, the light attenuation section 700 includes a first light attenuation section 710 and a second light attenuation section 720. Modulated light L generated in the modulated-light generation section 400 is reflected by a mirror 222. Subsequently, the modulated light L is attenuated such that the modulated light L is first reflected by the first light attenuation section 710 and next reflected by the second light attenuation section 720. The modulated light L that is reflected by the second light attenuation section 720 is incident on, and scanned by, the scanning section 500. With this configuration, the first and second light attenuation sections 710, 720 attenuates modulated light L. Thus, modulated light L can be attenuated more effectively. The light attenuation section 700 may have more than two light attenuation sections.

The first and second light attenuation sections 710, 720 can be formed, as described in the first embodiment, by using a material such as, but not limited to, a dielectric multilayer film, a polarizing plate, a half-silvered mirror, or a holographic reflector. Moreover, a clear substrate, for example, a glass plate or a plastic plate, can be used for the first and second light attenuation sections 710, 720.

The modulated light L transmitted through the first light attenuation section 710 is incident on the light receiving element 750. The control section 800 controls each of the driving circuits 420R, 420G, 420B in accordance with the detection results from the light receiving element 750. In addition, the control section 800 detects damage to the first light attenuation section 710 on the basis of the detection results of the light receiving element 750. However, the light absorber 760 may be disposed in place of the light receiving element 750.

The modulated light L transmitted through the second light attenuation section 720 is incident on a light absorber 770 that has light-absorbing properties. This terminates the path of the modulated light L after being transmitted through the second light attenuation section 720 so that the modulated light L is prevented from becoming stray light. However, a light receiving element similar to the light receiving element 750 can be disposed in place of the light absorber 770. By doing so, the control section 800 can control each of the driving circuits 420R, 420G, 420B in accordance with the detection results from this light receiving element as well as the light receiving element 750. In addition, the control section 800 can also detect damage to the second light attenuation section 720 on the basis of the detection results of this light receiving element. The configuration of the light absorber 770 is not specifically limited but may be similar to that of the light absorber 760.

The relationship between the reflectance of the first light attenuation section 710 for reflecting modulated light L and the reflectance of the second light attenuation section 720 is not specifically limited. However, it is preferable that the reflectance of the first light attenuation section 710 for reflecting the modulated light L be larger than the reflectance of the second light attenuation section 720. By increasing the reflectance of the first light attenuation section 710, the amount of the modulated light L transmitted through the first light attenuation section 710 is made small, thereby reducing heat generation in the first light attenuation section 710 that is caused by conversion of a portion of the modulated light L into heat. As described above, modulated light L generated in the modulated-light generation section 400 is first incident on the first light attenuation section 710. Accordingly, the intensity of the modulated light L being incident on the first light attenuation section 710 is larger than the modulated light L being incident on the second light attenuation section 720. Thus, a noticeably large amount of heat is generated in the first light attenuation section 710 as compared to the second light attenuation section 720. Making the reflectance of the first light attenuation section 710 larger than that of the second light attenuation section 720 can effectively reduce heat damage to the first light attenuation section 710.

However, the reflectance of the first light attenuation section 710 for reflecting modulated light L may be equal to the reflectance of the second light attenuation section 720. This makes it possible to form the first and second light attenuation sections 710, 720 by using the same material, which leads to cost reduction of the light attenuation section 700. The reflectance of the first light attenuation section 710 for reflecting modulated light L may be smaller than the reflectance of the second light attenuation section 720. This causes the amount of the modulated light L transmitted through the first light attenuation section 710 to be large, thereby increasing the intensity of the modulated light L incident on the light receiving element 750. As a result, a larger detection signal can be obtained from the light receiving element 750, which helps the control section 800 to control the modulated-light generation section 400 (light source) more precisely.

The image display apparatus 100 according to the present embodiment has been described. In the image display apparatus 100, as described above, the light attenuation section 700 includes the first light attenuation section 710, which reflects a portion of the modulated light L (light) emitted from the modulated-light generation section 400 (light source), and the second light attenuation section 720, which reflects a portion of the modulated light L reflected by the first light attenuation section 710. With this configuration, the first and second light attenuation sections 710, 720 attenuates modulated light L. Thus, modulated light L can be attenuated more effectively. Moreover, the amount of intensity reduction when attenuated by each of the first and second light attenuation sections 710, 720 can be made small. As a result, for example, the number of material choices available for the first and second light attenuation sections 710, 720 can be increased and the cost of the light attenuation section 700 can be reduced.

In the image display apparatus 100, as described above, the reflectance of the first light attenuation section 710 is larger than the reflectance of the second light attenuation section 720. This can reduce heat damage to the first light attenuation section 710 effectively. This provides the image display apparatus 100 with high reliability.

Thus, the second embodiment can also provide advantageous effects similar to those of the first embodiment.

In the present embodiment, the mirror 222 reflects modulated light L in a lateral direction. The mirror 222 is not limited to this configuration but may reflect modulated light L, for example, in the depth direction as viewed in the drawing of FIG. 7.

Third Embodiment

FIG. 8 is a cross-sectional view illustrating a display unit of an image display apparatus according to a third embodiment.

The third embodiment will be described below by focusing on differences from the above-described embodiment, and duplicated explanation is omitted for similar items.

An image display apparatus 100 according to the third embodiment is substantially same as that in the first embodiment described above except that the display unit 300 has a different configuration. Note that in FIG. 8, elements similar to those described in the previous embodiment are denoted by the same numerals.

As illustrated in FIG. 8, in the image display apparatus 100 according to the present embodiment, the cover portion 221 is formed as a third light attenuation section 223 that has a function of attenuating light proceeding in the thickness direction thereof uniformly (i.e., without depending on specific wavelengths). The third light attenuation section 223 can be formed, for example, by using a ND filter that includes a glass substrate in which a light-absorbing material is dispersed. Accordingly, the third light attenuation section 223 can be structured in a simple manner. However, the third light attenuation section 223 is not limited to this configuration.

With this configuration, modulated light L is attenuated not only by the light attenuation section 700 but also by the cover portion 221 (i.e., third light attenuation section 223). As a result, modulated light L can be attenuated more effectively. More specifically, modulated light L generated in the modulated-light generation section 400 is first transmitted through the cover portion 221 toward the outside. Next, the modulated light L is reflected by the light attenuation section 700 and subsequently transmitted again through the cover portion 221 toward the inside. Next, the modulated light L is scanned by the scanning section 500, subsequently transmitted again through the cover portion 221 toward the outside, and introduced to the deflector section 600.

By transmitting modulated light L multiple times through the cover portion 221, the cover portion 221 also can attenuate modulated light L effectively. Thus, modulated light L can be attenuated more effectively by the cover portion 221 being in collaboration with the light attenuation section 700. In addition, local heating of the cover portion 221 can be reduced since in the cover portion 221, a region through which modulated light L is transmitted for the first time, a region through which modulated light L is transmitted for the second time, and a region through which modulated light L is transmitted for the third time are regions different from each other. As a result, damage to the cover portion 221 can be reduced effectively.

Thus, the third embodiment can also provide advantageous effects similar to those of the first embodiment.

The image display apparatus and the head-mounted display according to the disclosure have been described with reference to exemplary embodiments illustrated in the drawings. However, the disclosure is not limited to these exemplary embodiments. For example, in the image display apparatus according to the embodiment, each element can be substituted by an element that has a similar function but has any arbitrary configuration, or each element can be supplemented by any other configuration. The embodiments may be combined with each other.

Moreover, the image display apparatus according to the embodiment is not limited to application to the eyeglasses-type head-mounted display as far as virtual images are formed for an observer to view. The image display apparatus can be applied, for example, to helmet-type or headset-type head-mounted displays or to types of image display apparatuses that are supported by observer's shoulders or neck. In the above embodiments, the entire image display apparatus has been described, by way of example, to be worn on the observer's head. However, the image display apparatus may have a portion that is worn on the observer's head and a portion that is worn on, or carried by, a part other than the observer's head.

Moreover, in the above embodiment, the configuration of a transmissive-type and both-eye-type head-mounted display has been described as a typical example. However, the image display apparatus may be configured to be a non-transmissive-type head-mounted display in which observer's outside view is blocked when wearing the head-mounted display. In addition, the image display apparatus according to the embodiment may include, for example, an apparatus that outputs sound, such as a speaker or a headphone.

The entire disclosure of Japanese Patent Application No. 2017-062566, filed Mar. 28, 2017 is expressly incorporated by reference herein.

What is claimed is:
1. A head-mounted display apparatus for use with a head of a user, the head-mounted display apparatus comprising:
   a frame configured to be worn on the head of the user;
   a first light source that emits a first light;
   a second light source that emits a second light;
   a light-combining section that combines the first light and the second light, and emits a combined light that includes the first light and the second light;
   at least one light attenuation section that: (a) reflects a portion of the combined light emitted from the light-combining section, and (b) transmits an other portion of the combined light emitted from the light-combining section, the at least one light attenuation section being attached to a temple portion of the frame of the head-mounted display apparatus;
   a scanning section that scans the portion of the combined light reflected by the at least one light attenuation section;
   a light absorber on which the other portion of light transmitted through the at least one light attenuation section is incident, the light absorber being configured to absorb the incident light; and a cover portion that is disposed between the scanning section and the at least one light attenuation section with respect to a first direction from the light-combining section to the at least one light attenuation section, wherein:

the scanning section is disposed between the light-combining section and the at least one light attenuation section with respect to the first direction, and the scanning section is disposed in the temple portion of the frame of the head-mounted display apparatus, the combined light from the light-combining section is incident on the at least one light attenuation section via the cover portion, and a portion of the combined light from the at least one light attenuation section is incident on the scanning section via the cover portion.

2. The head-mounted display apparatus according to claim 1, wherein the light attenuation section has a reflectance and a transmittance, and the reflectance of the light attenuation section is smaller than the transmittance of the light attenuation section.

3. The head-mounted display apparatus according to claim 1, further comprising:

a light receiving element on which the light transmitted through the light attenuation section is incident, wherein the light receiving element is configured to detect the incident light.

4. The head-mounted display apparatus according to claim 3, further comprising:

a circuit or controller configured to control activation of the light source in accordance with detection results of the light receiving element.

5. The head-mounted display apparatus according to claim 1, wherein the light attenuation section includes:
    a first light attenuation section that reflects a portion of light emitted from the light source, and
    a second light attenuation section that reflects a portion of the light reflected by the first light attenuation section.

6. The head-mounted display apparatus according to claim 5, wherein a first reflectance of the first light attenuation section is larger than a second reflectance of the second light attenuation section.

7. A head-mounted display apparatus for use with a head of a user, the head-mounted display apparatus comprising:

a frame configured to be worn on the head of the user;
a first light source that emits a first light;
a second light source that emits a second light;
a light-combiner that combines the first light and the second light, and emits a combined light that includes the first light and the second light;
a film or mirror configured to: (a) reflect a portion of the combined light emitted from the light-combiner, and (b) transmit an other portion of the combined light emitted from the light-combiner, the film or mirror being attached to a temple portion of the frame of the head-mounted display apparatus;

an optical scanner configured to scan the portion of the combined light reflected by the film or mirror;

a light absorber on which the other portion of light transmitted through the film or mirror is incident, the light absorber being configured to absorb the incident light; and a cover portion that is disposed between the optical scanner and the film or mirror with respect to a first direction from the light-combiner to the film or mirror, wherein:

the optical scanner is disposed between the light-combiner and the film or mirror with respect to the first direction, and the optical scanner is disposed in the temple portion of the frame of the head-mounted display apparatus, the combined light from the light-combiner is incident on the film or mirror via the cover portion, and a portion of the combined light from the film or mirror is incident on the optical scanner via the cover portion.

8. The head-mounted display apparatus according to claim 7, wherein the film or mirror has a reflectance and a transmittance, and the reflectance of the film or mirror is smaller than the transmittance of the film or mirror.

9. The head-mounted display apparatus according to claim 7, further comprising:

a light receiving sensor on which the light transmitted through the film or mirror is incident, wherein the light receiving sensor is configured to detect the incident light.

10. The head-mounted display apparatus according to claim 9, further comprising:

a circuit or controller configured to control activation of the light source in accordance with detection results of the light receiving sensor.

11. The head-mounted display apparatus according to claim 7, wherein the film or mirror includes:
    a first film or mirror that reflects a portion of light emitted from the light source, and
    a second film or mirror that reflects a portion of the light reflected by the first film or mirror.

12. The head-mounted display apparatus according to claim 11, wherein a first reflectance of the first film or mirror is larger than a second reflectance of the second film or mirror.

13. The head-mounted display apparatus according to claim 1, further comprising:

a circuit or controller configured to attenuate or weaken the light emitted by the light source in accordance with a scanning result of the scanning section.

14. The head-mounted display apparatus according to claim 7, further comprising:

a circuit or controller configured to attenuate or weaken the light emitted by the light source in accordance with a scanning result of the optical scanner.

* * * * *